United States Patent [19]

Amendola

[11] Patent Number: 4,760,664
[45] Date of Patent: Aug. 2, 1988

[54] FISHING LURE LIGHTED

[76] Inventor: Frank Amendola, 6147 W. Marshall, Chicago Ridge, Ill. 60415

[21] Appl. No.: 25,178

[22] Filed: Mar. 12, 1987

[51] Int. Cl.$^4$ ............................................. A01K 85/00
[52] U.S. Cl. ..................................................... 43/17.5
[58] Field of Search ................. 43/17.5, 17, 17.6, 42.1, 43/42.35

[56] References Cited

U.S. PATENT DOCUMENTS

| | | | |
|---|---|---|---|
| 1,192,001 | 7/1916 | Ryan | 43/17.5 |
| 2,485,087 | 10/1949 | Diamond | 43/17.5 |
| 2,711,044 | 6/1955 | Woods | 43/17.6 |
| 3,213,562 | 10/1965 | Salvin et al. | 43/17.5 |
| 3,502,861 | 3/1970 | Evans | 43/17.5 |
| 3,913,256 | 10/1975 | Morris et al. | 43/17.5 |
| 4,621,447 | 11/1986 | Rhodes | 43/17.5 |
| 4,658,532 | 4/1987 | McFarland et al. | 43/17.5 |

Primary Examiner—Nicholas P. Godici
Assistant Examiner—Karen Skillman
Attorney, Agent, or Firm—Paul H. Gallagher

[57] ABSTRACT

A casing including therein, a circuit board, with a flasher IC chip and a capacitor mounted thereon, a hearing aid type battery removably mounted in the casing in engagement with the circuit board, and a cork holding the battery in place. It also includes an inside coaxial cable leading from an element on the circuit board to an outlet socket in the casing. The lure additionally includes a hook component, which itself includes an outside coaxial cable with a plug at one end detachably inserted in the socket in the casing and connected with the inside coaxial cable. The hook component also includes a light bulb on the extended end of the outside coaxial cable. Fishhooks are secured to the extended end of the outside coaxial cable. The lure has an eyelet for securement thereto of a fishing line.

13 Claims, 1 Drawing Sheet

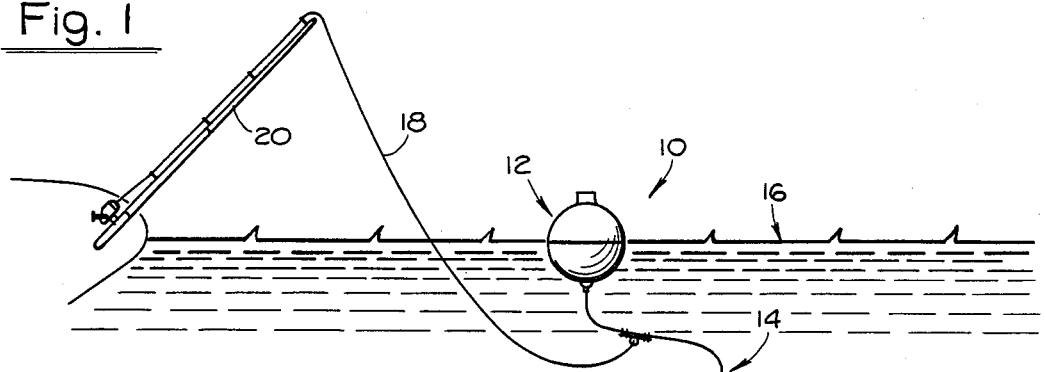
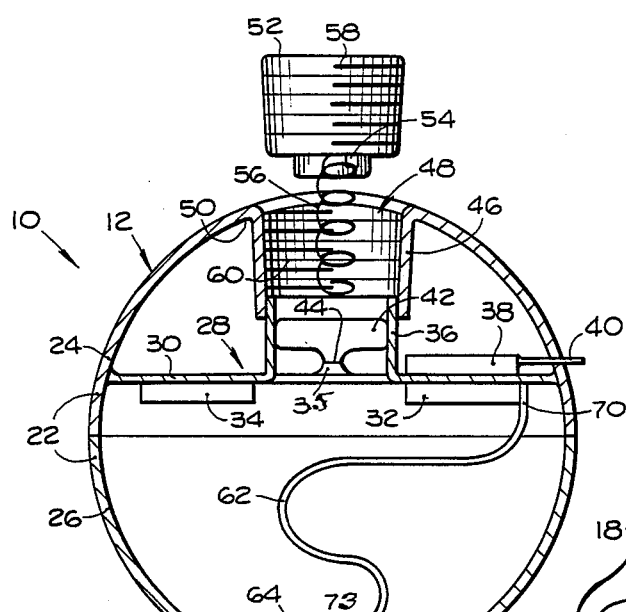
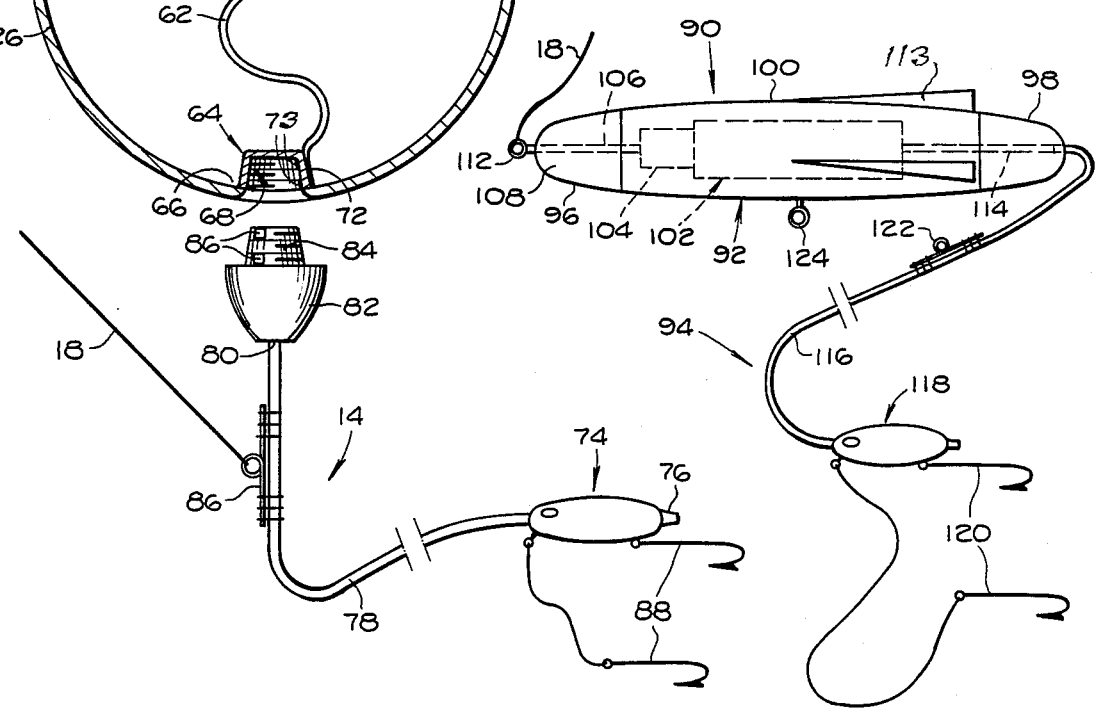

FISHING LURE LIGHTED

FIELD OF THE INVENTION

The invention lies in the field of fishing lures and particularly lighted fishing lures, and such lures that are electrically lighted.

OBJECTS OF THE INVENTION

A broad object of the invention is to provide a novel lighted fishing lure.

Another object is to provide such a fishing lure having the following features and advantages:

1. It is electrically lighted, and of such construction as to incorporate small components in keeping with a desired small size of lure, but enables long life of the battery that is utilized therein, which is necessarily small.

2. It is of blinking character, and has simple means for easily turning it on for use and turning it off when not in use, and easily adjusted for varying the flash rate of blinking.

3. It is of very simple construction, being made up in large part of items that are known and readily accessible.

4. The construction can be incorporated in lures of various shapes and kinds.

DESCRIPTION OF CERTAIN PREFERRED EMBODIMENTS

In the drawings:

FIG. 1 is a general view of the fishing lure of the invention in a setting of use.

FIG. 2 is a large view of the lure, with the body component in sections.

FIG. 3 shows a modified form of the fishing lure.

Referring to the invention in general, the fishing lure includes a self contained lighting or illumination device, which itself includes a battery and a light, the light preferably being in the form of an LED. The particular form of the lighting component is of flashing type. This flashing feature provides an added attraction to the fish, and it provides for a long life of the battery.

The disclosure of the fishing lure of the invention assumes two forms, one, of the float or still fishing type, as represented in FIGS. 1 and 2, and the other the sinking type, adapted for trolling, as shown in FIG. 3.

Referring first to FIG. 1, the fishing lure is indicated in its entirety at 10, and includes two main components, namely a body component 12 and a hook component 14. The fishing lure is represented in FIG. 1 in a body of water 16 and connected to a fishing line 18 on a pole 20.

Attention is next directed to FIG. 2, showing the fishing lure in large scale, and particularly the body component 12 thereof. In FIG. 2 the body component 12 constitutes a float, and may be generally spherical as shown, and includes a casing 22 that is generally hollow, and made up of halves, namely, a top half 24 and a bottom half 26. These halves are of shell-like form, and are fitted together with the open sides facing each other, and are secured together by any suitable means, after the internal elements are inserted therein as referred to hereinbelow, and sealed against entrance of water thereinto.

Mounted in the top half 24 is a PC board unit 28 which includes a board or board, 30. Mounted on the board 30 is a capacitor 32 and an IC chip 34 operable for providing a flashing effect as referred to hereinbelow.

The board 30 is provided with a central contact element 35 surrounding which is a battery holding tube 36 preferably secured to the board. Also mounted on the board 30 is an adjustable resistor 38 having an element 40 for making adjustments in the resistor, the element 40 extending to the exterior for access for manual manipulation. The resistor 38 is operable, upon adjustment thereof, for varying the period of flashing. The various electrical elements mounted on the board 30 may be referred to generally as circuitry.

The PC board unit 28 just referred to is of known type and need not be described in detail, but certain steps in this functioning or operation are referred to hereinbelow.

Positioned in the tube 36 is a battery 42 of hearing aid type, which is already known, and has a central contact 44 engagable with the central contact 35 on the board. The tube 36 serves as a conductor, connected with the electrical elements in the PC board unit 28, and operable, as explained hereinbelow, for establishing electrical connection between the battery, and the elements on the PC board.

The top half 24 of the casing has an inturned tubular element 46 surrounding an opening 48 in the casing half. The tubular element 46 may be made integral with the casing half, or separate and connected thereto as at 50 and sealed at that location against the passage of water.

The opening 48 is closed by a cap 52 which may be in the form of a plug and has an external electrical contact 54. The cap 52 also has a compression spring 56 connected to its inner end, this spring also constituting an electrical contact, and the cap being arranged for electrical continuity between those contacts 54, 56. The cap 52 may be detachably secured in the tubular element 46 as desired, such as by threading as indicated at 58, 60, respectively. When the cap 52 is threaded down into the tubular element 46, the spring 56 engages the battery and holds the battery in place with the contacts 44, 35, in firm contact inter-engagement. Also the spring 56 forming a contact as referred to above, engages an external contact on the battery and the cap produces electrical contact through the contacts 56, 54, and from the latter to the tube 42, which functions as a contact, and is electrically connected with electrical elements on the PC board. Thus the cap 52 serves the purpose of holding the battery firmly in place, and providing electrical circuit control, and it serves as a switch means for controlling the circuitry, An electrical cable 62 is connected with the PC board unit for providing illumination of the light in the lure. This element 62 is preferably a coaxial cable, but it may assume the form of any desired electrical conductor operative for producing the lighting effect desired. The cable 62 may be referred to as an inside coaxial cable, for convenience.

The bottom casing half 26 includes a socket member 64 of suitable construction, sealed between the interior and exterior as at 66 and providing a socket 68 open to the exterior. The coaxial cable 62 is connected at an inner end at 70 with the circuitry on the PC board, and at an extended end at 72 is connected with the socket member 64 and includes contacts 73 exposed in the socket.

The hook component 14 includes a plug 74 forming a light or light unit which itself includes a light element 76 preferably in the form of a LED. The hook component has an outside coaxial cable 78 having a first end 80 mounted in a plug 82 having a threaded element 84 in which are electrical contacts 86 exposed to the exterior. The socket 68 and the reduced element 84 may be threaded for mounting the plug in the socket, and when it is in properly mounted position, the contacts 86 and 73 are respectively in inter-engagement. Thus the two coaxial cables are interconnected, and the light unit 74 connected with the circuitry, and thus the battery 36 in the body member.

Preferably an eyelet 86 is mounted on the outside coaxial cable 38 for connection of the fishing line 18 to the lure. Fishing hooks 88 are attached to the plug or light unit 84.

In the use of the fishing lure 10 of FIGS. 1 and 2, the lure is dropped into the water, the body member provides a float, and the hook component 14 is free to sink or drop. When a fish strikes, the user in pulling on the line, directly pulls on the hook component and pulls the fish in, without putting any strain on the body component.

In the operational functioning of the fishing lure, the arrangement of the PC board unit circuitry and the battery produces a flashing effect in the light element. This flashing effect is produced or controlled by the flasher IC chip 34. This circuitry, and battery, and flasher IC chip are made up of elements that are well known and perform respective functions according to their individual characteristics. Because of this it is believed unnecessary to describe the characteristics of each or any of the elements in detail, but it is to be stated that they are put together in such a way as to function together for producing the desired result in the flashing of the LED 76. The PC board unit circuitry provides either a fixed or an adjustable flashing time period, i.e. in any given setting the period remains fixed, and the adjustability feature provides for an adjustment of the period.

The fishing lure of FIG. 3, indicated in its entirety at 90, is the same as that of FIGS. 1 and 2, in their overall purpose and functioning, but they differ in constructional detail. As indicated above, the fishing lure of FIGS. 1 and 2 is of the floating type, while that of FIG. 3 is of the sinking type for trolling and reeling in. The fishing lure of FIG. 3 includes a body component 92 and a hook component 94. The body component 92 is of elongated shape, having a front end 96 and a rear end 98, and includes a casing 100 in which is mounted a PC board unit 102, and mounted in connection therewith is a component 104 in which is mounted a battery, which is controlled in placing it in position by a shank or stem 106 extending through a cap 108 detachably mounted on the casing at the front end. The stem 106 extends through the cap to the exterior where an eyelet 112 is secured thereto, the fishing line 18 being secured to the eyelet. The body component is preferably provided with stabilizing fins 113.

Detachably mounted on the rear end of the casing is a shaft 114 and the hook unit 94 has an outside coaxial cable 116 which extends through the cap 98 and into operative engagement with the circuitry on the PC board unit 102 in the manner similar to that of FIGS. 1 and 2. A plug or light unit 118 similar to the light unit 74 is mounted on the outside coaxial cable, and is provided with fish hooks 120. In FIG. 3 an eyelet 122 is mounted on the outside coaxial cable for connection with the fishing line 18 thereto, in an alternative arrangement. The hook units 94 and 14 may be identical, the former thus having the eyelet 122, indicating the use of a single kind of hook component with either of the body members 12 or 90.

If desired, the housing 92 may be provided with another eyelet 124 for mounting a hook thereon, this arrangement being convenient when it is desired to have the body component 90 appear as a fish.

I claim:

1. A fishing lure comprising,
   a body component and hook component, both adapted to be cast into the water and remain there in the complete fishing operation,
   a PC board unit, including a flasher IC chip, in the body component
   a battery removably mounted in operable position in the body component in electrical engagement with the circuitry thereon including said IC chip,
   an inside coaxial cable in the body component having a first end in operable engagement with said circuitry and having an extended end adjacent the outer surface of the body component,
   the hook component including an outside coaxial cable with a first end detachably mounted on the body component and thereby connected with the extended end of the inside coaxial cable,
   a light in the hook component and thereby on the extended end of the outside coaxial cable and operably connected therewith,
   fishhooks on the hook component, and
   means on the hook component for connection with a fish line, and the hook component thereby being capable of receiving the pulling force from the fish line, in pulling in the line.

2. A fishing lure according to claim 1 wherein, the body component constitutes a float.

3. A fishing lure according to claim 1 wherein, the body component constitutes a sinker adapted for trolling.

4. A fishing lure according to claim 1 wherein, the body component includes a casing having an opening for receiving said battery, in said operable position, and
   a cap detachably mounted in said opening retaining the battery in its said operable position.

5. A fishing lure according to claim 4 wherein, said cap includes contacts operable, when the cap is in an operable position in said opening, for connecting the battery in the circuitry, and when withdrawn from said opening for disconnecting the battery from the circuitry.

6. A fishing lure according to claim 4 wherein, the cap is adjustable in the opening toward and from the battery, and thereby being operable to respectively make and break circuit between the battery and the circuitry.

7. A fishing lure according to claim 1 wherein, the flasher chip is operable for predetermining the time period of flashing of the light, and
   the PC board unit includes means for manually adjusting the length of the time periods of flashing of the light.

8. A fishing lure according to claim 1 wherein, the body member includes a socket member forming a socket exposed to the exterior and otherwise sealing the interior of the body member to the exterior,
   the socket member including electrical contacts, and
   the hook component being separate and detached from the body component and including a plug capable of being inserted into the socket and locked therein, the plug having electrical contacts, and the electrical contacts in the socket and on the plug being respectively in operable engagement when the plug is locked in the socket.

9. A fishing lure according to claim 4 wherein, said casing includes a pair of shell-like halves, including a top half and a bottom half, having open sides interfacing when the halves are fitted together, the PC board unit is mounted in the top half, the top half has said opening formed therein, said inside coaxial cable has its said first end connected to the PC board unit, and it extends through the space of the bottom half and has its extended end connected to the lower half, the lure includes means for connecting said first end of the outside coaxial cable to the bottom shell and when it is so connected, it is connected with the inside coaxial cable as stated.

10. A fishing lure according to claim 2 wherein, the outside cable includes an eyelet for connection of a fishing lure thereto.

11. A fishing lure according to claim 3 wherein, the body member includes an elongated casing having a front end and a rear end, said cap is mounted in the front end of the casing, the cap includes an eyelet for securement thereto of a fishing line.

12. A fishing lure according to claim 11 wherein, the lure includes additional eyelets, adjacent the casing, for securement thereto of a fishing line.

13. A fishing lure according to claim 11 and including, stabilizing fins on the body components.

* * * * *